(12) United States Patent
Denda et al.

(10) Patent No.: US 6,667,938 B2
(45) Date of Patent: Dec. 23, 2003

(54) INFORMATION RECORDING AND REPRODUCING APPARATUS

(75) Inventors: Akihiro Denda, Saitama (JP); Yoshiya Nonaka, Saitama (JP)

(73) Assignee: Pioneer Corporation, Tokyo (JP)

( * ) Notice: Subject to any disclaimer, the term of this patent is extended or adjusted under 35 U.S.C. 154(b) by 95 days.

(21) Appl. No.: 10/098,144

(22) Filed: Mar. 15, 2002

(65) Prior Publication Data

US 2002/0131353 A1 Sep. 19, 2002

(30) Foreign Application Priority Data

Mar. 16, 2001 (JP) .................................... P. 2001-075958

(51) Int. Cl.[7] .............................................. G11B 7/00
(52) U.S. Cl. ...................................... 369/53.18; 369/84
(58) Field of Search ................................ 369/53.18, 84, 369/53.36, 53.42, 47.12, 47.13

(56) References Cited

U.S. PATENT DOCUMENTS 5,631,888 A * 5/1997 Itoh et al. ..................... 369/84
6,049,437 A   4/2000 Wevers

FOREIGN PATENT DOCUMENTS

EP          0 399 853 A2      5/1990

OTHER PUBLICATIONS

Japanese Abstract No. 09244817, dated Sep. 19, 1997.
Japanese Abstract No. 05128638, dated May 25, 1993.
* cited by examiner Primary Examiner—Nabil Hindi
(74) Attorney, Agent, or Firm—Sughrue Mion, PLLC

(57) ABSTRACT

In a case where there occurs an even of interrupting recording operation such as a power cut out or a communication error, while creating a library in the hard disk by a recording/reproducing section 3, a system control microprocessor 31 controls to automatically delete a halfway file that is not completely recorded, thereby preventing the halfway recorded file from being accumulated in the hard disk B.

6 Claims, 3 Drawing Sheets

INFORMATION RECORDING AND REPRODUCING APPARATUS

BACKGROUND OF THE INVENITON

1. Field of the Invention

The present invention relates to an information recording/reproducing apparatus for reproducing program information recorded on a first recording medium and recording program information on a second recording medium.

2. Description of the Related Art

There is an information recording/reproducing apparatus for reproducing and recording program information in which the program information recorded on a CD (Compact Disc), for example, is reproduced, and recorded on a hard disk, and the recorded program information is read and reproduced from the hard disk.

The hard disk records information compressed by compression methods, including the MP3 (MPEG: Moving Picture Experts Group; Audio Layer III) and the ATRAC3 that is improved from the ATRAC (Adaptive Transform Acoustic Coding).

For instance, in a case where music information to be played for one minute is compressed and recorded on the hard disk, the recodable size of the hard disk amounts to about 1M bytes. Supposing that the hard disk has a storage capacity of about 10G bytes, 2000 pieces of music can be recorded if the playback time of one piece of music is five minutes.

In this way, the hard disk can store more program information than the CD. Also, the access speed in reproducing the program information recorded on the hard disk is faster than in reproducing the program information recorded on the CD, and the hard disk can be recovered from the external vibration more rapidly, whereby the hard disk provides many advantages over the CD player for reproducing the program information recorded on the CD. Therefore, there is a trend for developing a market for the information recording/reproducing apparatus with the hard disk, which is mainly mounted on the vehicle.

By the way, in the information recording/reproducing apparatus with the hard disk, in order to reproduce the program information recorded on the CD while recording it efficiently on the hard disk, there has been a proposal of automatically recording the program information on the hard disk, without the user operating a recording mode provided on an operation panel. Namely, it is possible to effect the efficient recording in which a library is automatically created on the hard disk only by reproducing the program information recorded on the CD, without regard to a user's will to record the program information.

However, in the information recording/reproducing apparatus which is mounted on the vehicle, for example, if the driver stops the engine to get off the car in course of reproducing the program information recorded on the CD, the supply of electric power to the apparatus is cut out, whereby the reproducing operation and the recording operation on the hard disk are interrupted. Thereby, the program information may not be fully recorded to the end of data at the time of interrupt.

If the user extracts the CD out of the apparatus main body to exchange the CD in course of reproducing the program information recorded on the CD, the reproducing/recording operation is interrupted, whereby the program information may not be fully recorded to the end of data at the time of interrupt. Moreover, when the exchanged CD is inserted into the apparatus main body, and reproduced, the program information that is different from the program information reproduced before may be reproduced, possibly resulting in a situation that the different program information may be recorded in a recording area next to that of the program information recorded halfway.

In this manner, if a library is created automatically on the hard disk only by reproducing the program information recorded on the CD, without regard to a user's will, various events may possibly occur, thereby bringing about the above trouble.

SUMMARY OF THE INVENTION

The present invention has been achieved in the light of the above-mentioned problems, and it is an object of the invention to provide an information recording/reproducing apparatus in which the program information recorded on a first recording medium (e.g., a CD) is reproduced and automatically recorded on a second recording medium (e.g., a hard disk), without regard to a user's will, and the program information that is not fully recorded to the end of data upon an event of interrupting the reproducing/recording operation is deleted, thereby making the effective use of a recording area of the second recording medium.

In order to accomplish the above object, according to the present invention, there is provided an information recording/reproducing apparatus for reproducing program information recorded on a first recording medium and recording the reproduced program information on a second recording medium, comprising reproducing means for reproducing the program information recorded on the first recording medium, recording means for recording the program information reproduced by the reproducing means on the second recording medium, deletion means for deleting the program information recorded on the second recording medium, and control means for controlling the reproducing means and the recording means to perform the parallel processings of recording the program information on the second recording medium and reproducing the program information from the first recording medium, characterized in that the control means controls the deletion means to delete automatically the program information that is not completely recorded at the time when an event occurs of interrupting the reproducing/recording operation while reproducing and recording the program information by the reproducing means and the recording means.

The control means controls the deletion means to delete automatically the program information that is not completely recorded on the second recording medium, when the supply of electric power to at least one of the reproducing means and the recording means is cut out.

Also, the control means controls the reproducing/recording operation to be resumed from the top position of the program information that is automatically deleted, when the event of interrupting the reproducing/recording operation is resolved.

With the information recording/reproducing apparatus of the invention as constituted in the above way, the program information recorded on the first recording medium is reproduced by the reproducing means, and in parallel, the reproduced program information is recorded on the second recording medium by the recording means, without regard to a user's will. Also, when an event of interrupting the reproducing and recording operation occurs, such as when the supply of electric power is cut out during the reproducing and recording operation, the program information recorded halfway that is not completely recorded to the end of data is automatically deleted. And when the event is resolved, the reproducing and recording operation is resumed from the top position of the automatically deleted program information.

Thereby, the reproducing and recording operation is performed without regard to a user's will. Even if the event of interrupting the operation during the recording operation, the program information recorded halfway on the second recording medium is automatically deleted, thereby making the effective use of the recording area of the second recording medium. Also, even if the event is resolved, and the automatically deleted program information is reproduced again, the reproducing and recording operation is performed from its top position, whereby the program information can be recorded continuously and with high accuracy.

DETAILED DESCRIPTION OF THE PRESENT INVENTION

The present invention will be described below with reference to the accompanying drawings.

First of all, the configuration of an information recording/reproducing apparatus will be set forth with reference to a block diagram of FIG. 1.

Figure 1:
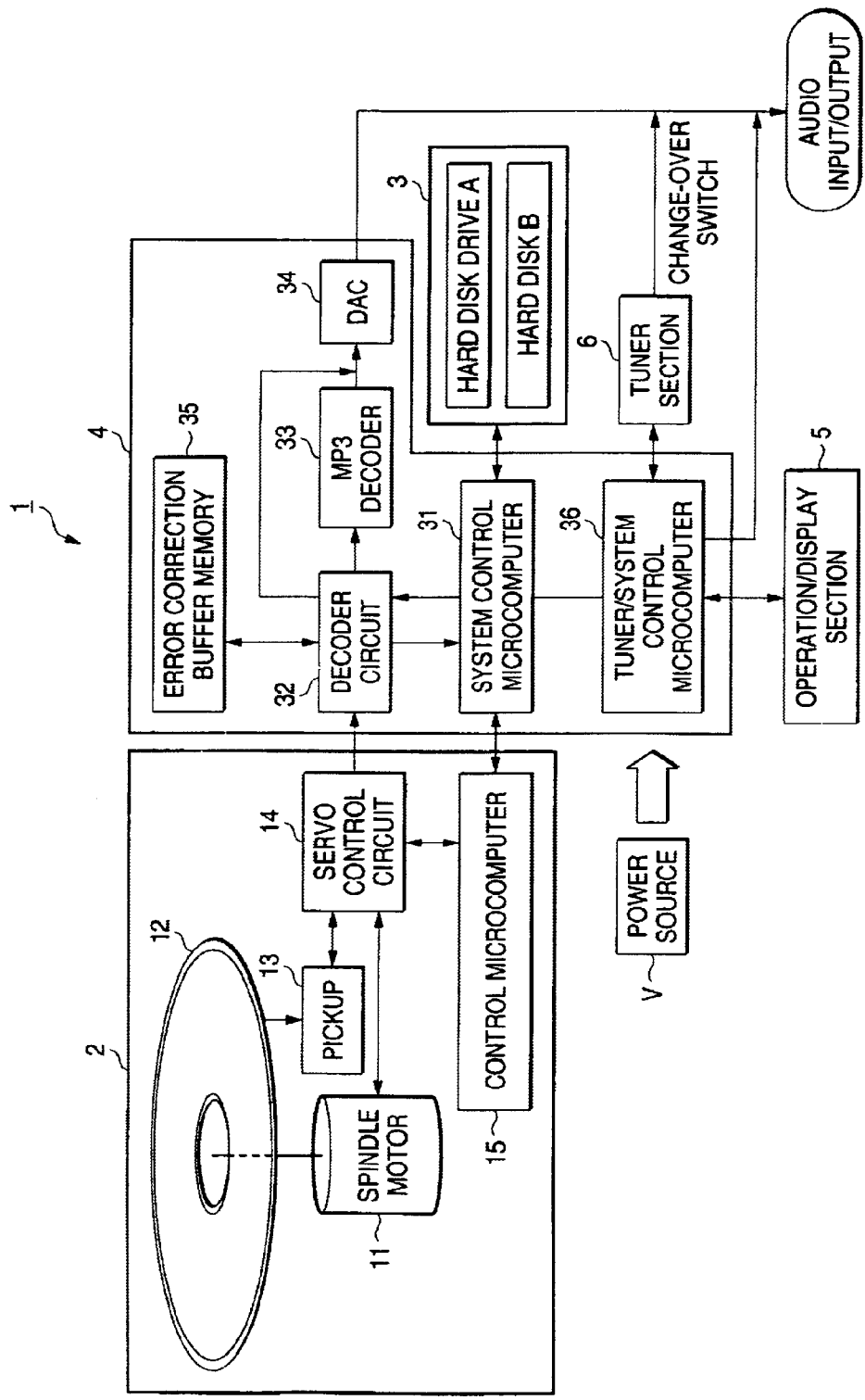
FIG. 1 is a block diagram showing one embodiment of the present invention.

In FIG. 1, the information recording/reproducing apparatus 1 comprises a reproduction section 2 for reproducing the program information recorded on the first recording medium 12 such as CD, CD-ROM or DVD (hereinafter referred to as an "optical disc"), a recording/reproducing section 3 for recording the program information on the second recording medium such as hard disk (hereinafter referred to as a "hard disk") or reproducing the recorded program information, a control section 4 for controlling the reproduction section 2 and the recording/reproducing section 3 and making compression or expansion of the program information reproduced by the reproduction section 2 and the recording/reproducing section 3, and an operation/display section 5 having an operation portion for the user to make the operation and a display portion formed of a liquid crystal display.

The reproduction section 2 comprises a spindle motor 11 for rotating the mounted optical disc 12 at a predetermined linear velocity, a pickup 13 for reading optically the information recorded on the optical disc 12 and converting it into electrical signal for output, a servo control circuit 14, and a control microcomputer 15.

The servo control circuit 14 performs the signal processing of an electrical signal output from the pickup 13 to generate an error signal such as a tracking error signal or a focus error signal, and an RF signal. After the generated RF signal is converted into digital data, the digital data is demodulated and error corrected in conformance with a data format of the optical disc 12, and supplied to a decoder circuit 32 provided in the control section 4.

Also, the servo control circuit 14 makes the focus servo and tracking servo with pickup 13 by an error signal such as a focus error signal or tracking error signal, and a synchronization error signal obtained by the demodulation and the error correction in accordance with an instruction from the control microcomputer 15, and makes the servo control for the rotation speed of the spindle motor 11.

Also, the servo control circuit 14 supplies the demodulated and error corrected data to the decoder circuit 32, and supplies the identification information recorded on the optical disc 12 to a CD control microcomputer and a system control microcomputer 31 provided on the control section 4.

This identification information is the TOC information recorded in a read-in area of the CD in the case where the optical disc 12 is the CD. This TOC information includes the reproduction condition of the program information, and the attached number for identifying the program information (hereinafter referred to a "track number"), whereby the servo control circuit 14 supplies this information to the control microcomputer 15 and the system control microcomputer 31.

The recording/reproducing section 3 comprises a hard disk drive A and a hard disk B that is a recording area where the program information is recorded by the hard disk drive A. The hard disk drive A involves the recording of the program information onto the hard disk B, and the reproduction or deletion of the recorded program information. In the hard disk B, a file folder or a storage area is formed to store the program information when the program information is recorded by the hard disk drive A.

The control section 4 comprises the decoder circuit 32 for decoding the demodulated and error corrected data supplied from the servo control circuit 14 of the reproduction section 2, or the data reproduced by the hard disk drive A, an error correction buffer memory 35 for temporarily storing the data demodulated and error corrected by the servo control circuit 14 and rearranged in a predetermined order, an MP3 decoder 33 for expanding the compressed data through a predetermined compression processing (e.g., compressed data by the MP3 method or ATRAC3 method, MP3 data is used for the following discussion in this embodiment), a DAC 34 for outputting the expanded data in a digital form or an analog form by converting the digital data into analog data, the system control microcomputer 31, a change-over switch Y, and a tuner/system control microcomputer 36.

The system control microcomputer 31 comprises a microprocessor (MPU), and controls the entire operation of the information recording/reproducing apparatus 1 by performing a predetermined program. Also, the system control microcomputer 31 makes the compression of data in conformance with the ATRAC3 standard if the decoded data is supplied from the decoder circuit 32. And it controls the hard disk drive A to record the compressed data on the hard disk B. At this time, the identification information for identifying the program information is also recorded on the hard disk B, corresponding to the compressed data.

The control microcomputer 15 and the system control microcomputer 31 have internal memories, not shown, to memorize the identification information supplied from the servo control circuit 14. Each of the control microcomputer 15 and the system control microcomputer 31 recognizes which program information is recorded on the hard disk B by confirming the identification information memorized in its internal memory.

The change-over switch Y makes a switching between the data output from the DAC 34 and the data output from the tuner section 6 to be supplied to an amplifier, not shown. This change-over switch Y is transferred to be connected with the signal line of the DAC 34 to supply the data output from the DAC 34, when the program information recorded on the optical disc 12 is reproduced, or the program information recorded on the hard disk B is reproduced, or transferred to be connected with the signal line of the DAC 34 to supply the received information, when the received information reproduced from the tuner section 6 is output. The change-over switch Y is transferred in accordance with an instruction from the system control microcomputer 31.

The tuner/system control microcomputer 36 controls the interface with the operation/display section 5 to be connected. That is, the display data is supplied to the operation/display section 5 in accordance with an instruction from the system control microcomputer 31, and an operation signal from the operation portion provided in the operation/display section 5 is supplied to the system control microcomputer 31.

Also, this tuner/system control microcomputer 36 is connected to the tuner section 6 for receiving the transportation information or RDS information by the FM multiplex broadcasting, in which the received information supplied from the tuner section 6 is transformed into display data and supplied to the operation/display section 5, and a signal indicating the reception is supplied to the system control microcomputer 31.

The information recording/reproducing apparatus 1 of the invention operates by electric power supplied from a predetermined power source V. In the case where the information recording/reproducing apparatus 1 is a car audio device mounted on the vehicle, it is supplied with electric power from the power source (vehicle mounted battery) V when a starter key is operated to a specified position.

Further, the information recording/reproducing apparatus 1 of the invention comprises an auxiliary power source (e.g., storage condenser of large capacity), whereby if the system control microcomputer 31 detects a cut out of electric power from the power source V, the operation of the information recording/reproducing apparatus 1 can be continued for a short time by the auxiliary power source.

The operation/display section 5 comprises a display portion (not shown) for displaying the transportation information supplied from the tuner section 6 in characters on the basis of the display data supplied from the tuner/system control microcomputer 36, and an operation portion (not shown) having a reproduction command button that is depressed to reproduce the program information recorded on the optical disc 12 and a source selection button for selecting the source such as optical disc 12 or tuner section 6.

In the information recording/reproducing apparatus 1 as constituted above, if the user manipulates the source selection button on the operation portion to designate the optical disc 12, and depresses the reproduction command button, the operation/display section 5 sends its operation signal via the tuner/system control microcomputer 36 to the system control microcomputer 31.

And the system control microcomputer 31 sends a control signal to the control microcomputer 15 to instruct the reproduction, and controls the change-over switch Y to connect with the signal line of the DAC 34.

The control microcomputer 15 controls the servo control circuit 14 in accordance with an instruction from the system control microcomputer 31. And the servo control circuit 14 drives the spindle motor 11 and the pickup 13 in accordance with the instruction to reproduce the program information recorded on the optical disc 12 and supplies the data obtained from the optical disc 12 to the decoder circuit 32 of the control section 4.

The decoder circuit 32 supplies the data from the servo control circuit 14 to the error correction buffer memory 35, decodes the data rearranged in a predetermined order by the error correction buffer memory 35, and supplies the decoded data to the system control microcomputer 31, the MP3 decoder 33 or the DAC 34. The MP3 decoder expands the compressed data and supplies the data to the DAC 34, and the DAC 34 outputs the supplied data in digital form or analog form by converting digital data into analog data to the amplifier, not shown.

The system control microcomputer 31 compresses the data supplied from the decoder circuit 32 into the data in conformance with the ATRAC3 standards, and controls the hard disk drive A to record the data and the identification information supplied beforehand from the servo control circuit 14 corresponding to the data on the hard disk B.

In the case where the source selected by the user is the tuner section 6, the system control microcomputer 31 controls the change-over switch Y to connect with the signal line of the tuner section 6 side. And it outputs the received information received by the tuner section 6.

In this manner, if the user designates the reproduction of the optical disc 12 by manipulation of the source selection button and depresses the reproduction command button, the program information recorded on the optical disc 12 is reproduced, while the reproduced program information is recorded automatically on the hard disk B. Accordingly, a library can be created in the hard disk without regard to a user's will.

Referring now to a flowchart of FIG. 2, the processing operation of the system control microcomputer 31 according to this invention will be described below.

First of all, the user inserts the optical disc 12 into an inlet slot, not shown, of the reproduction section 2, whereby the optical disc 12 is brought to a predetermined reproduction position, and mounted on a turntable, not shown.

If the user manipulates the source selection button and the reproduction command button provided on the operation/display section 5, the system control microcomputer 31 controls the control microcomputer 15 to initiate a servo of the spindle motor 11 to reproduce the program information recorded on the optical disc 12. And in the case where the optical disc 12 is the CD, the pickup 13 reads the TOC information that is the identification information recorded in the read-in area (step S21).

The start of reproduction operation for the optical disc 12 may be automatically effected by selecting the source upon mounting the optical disc 12 at reproduction position, without manipulating the source selection button and the reproduction instruction button.

The system control microcomputer 31 checks whether or not there is the program information unrecorded on the hard disk B is by comparing the TOC information read by the pickup 13 with the identification information recorded on the hard disk B (step S22).

If it is determined that the program information unrecorded on the hard disk B does not exist (already recorded), the normal reproduction operation is performed by the reproduction section 2 without performing the recording operation on the hard disk B.

That is, the data decoded by the decoder circuit 32 is not supplied to the system control microcomputer 31, but output via the MP3 decoder 33 and the DAC 34.

If it is determined that the program information unrecorded on the hard disk B exists (not recorded), the reproducing/recording operation is performed to record the program information on the hard disk B (step S23).

It is determined whether or not the source selection button is manipulated by the user in the midst of reproducing the program information recorded on the optical disc 12 while recording it on the hard disk B (step S24).

If it is determined that the source selection button is manipulated by the user, namely, an operation signal indicating that the source selection of the tuner section 6 is made from the operation/display section 5 is supplied, or the tuner section 6 has received the reception (interrupt) information such as transportation information, the system control microcomputer 31 controls the change-over switch Y to connect with the signal line of the tuner section 6 (step S27).

If the change-over switch Y is transferred, the reception information from the tuner section 6 can be output, but the reproducing/recording operation in which the program information recorded on the optical disc 12 is reproduced and recorded on the hard disk B is continued. That is, the system control microcomputer 31 controls the control microcomputer 15 and the hard disk drive A continuously to reproduce the program information recorded on the optical disc 12 and record the reproduced program information onto the hard disk B. And if the reproducing/recording operation is still continued when the source selection button is manipulated by the user again to designate the reproduction for the program information recorded on the optical disc 12, or the output of reception information has been completed by the tuner section 6, the change-over switch Y is transferred to connect with the signal line of the DAC 34 again to output the program information recorded on the optical disc 12.

If the source is not changed, it is determined whether or not the supply of the data to the system control microcomputer 31 is ceased (communication error), owing to the cause that the supply of electric power from the power source V is cut out, or the optical disc 12 is extracted for exchange from the reproduction section 2 by the user (step S25).

If it is determined that the supply of electric power is cut out or a communication error occurs, the recording operation is stopped by controlling the hard disk drive A (step S28).

And it is determined whether or not the program information has been recorded to the end of data on the hard disk B at the interrupt time.

Figure 3:
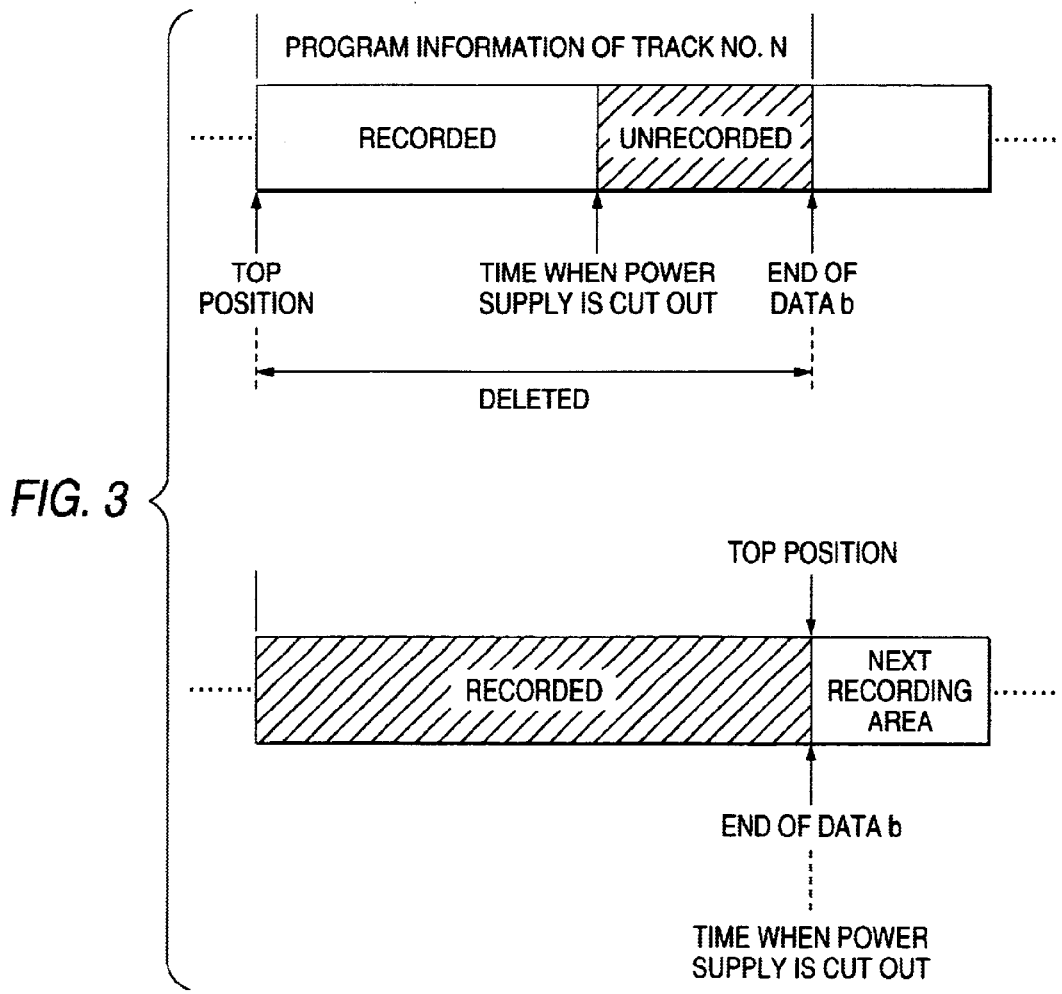
FIG. 3 is a diagram for explaining the operation in the embodiment of the invention, and typically showing how program information is recorded on a hard disk B at the time of interrupting reproducing/recording operation.

FIG. 3 typically shows how the program information is recorded on the hard disk B at the interruption of the reproducing/recording operation.

As shown in FIG. 3, if the supply of electric power is cut out when the program information of track number N is reproduced (recorded), the program information is recorded on the hard disk B but not recorded to the end of data b. If the supply of electric power is cut out after the completion of the reproduction for the program information of track number N, the program information has been recorded on the hard disk B fully to the end of data b.

Herein, the system control microcomputer 31 determines that the supply of electric power is cut out, it is checked whether or not the program information has been fully recorded to the end of data while the electric power is supplied from the auxiliary power source.

If it is determined that the program information has been recorded to the end of data, the hard disk drive A is enabled to record the program information from the top position of the next recording area. And the system control microcomputer 31 controls the control microcomputer 15 to stop the reproducing operation of the program information recorded on the optical disc 12, and start the reproduction of the program information next to the program information being reproduced at the time of interruption from its top position.

Figure 2:
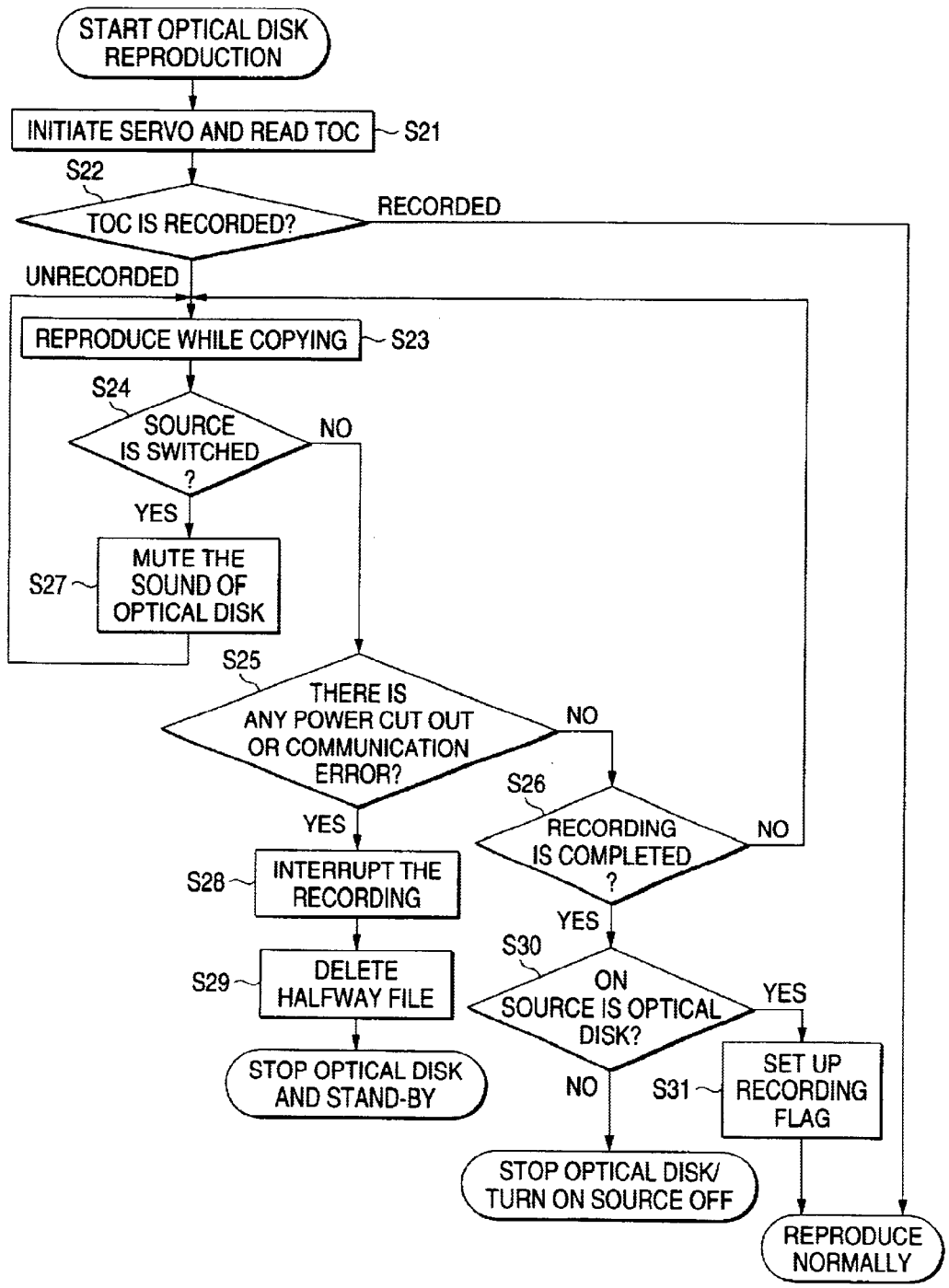
FIG. 2 is a flowchart for explaining operation in the embodiment of the invention.

If it is determined that the program information is not recorded to the end of data, the hard disk drive A is enabled to delete the program information recorded halfway, namely, the program information of track number N as shown in FIG. 2 (step S29), and record the program information from the top position of the deleted recording area. And the system control microcomputer 31 controls the control microcomputer 15 to stop the reproducing operation of the program information recorded on the optical disc 12, and move the pickup 13 to the top position of the program information being reproduced at the time of interruption to start the reproduction.

In a case where the program information recorded on the optical disc 12 is reproduced again by releasing the state where the supply of electric power is cut out or a communication error occurs, the reproducing/recording operation is continued from the reproduction start position or the recording start position.

If it is determined that the supply of electric power is not cut out, or no communication error occurs, it is checked whether or not the reproduction of the program information recorded on the optical disc 12 is completed, namely, the recording of the program information onto the hard disk B is completed (step S26)

If it is determined that the reproducing/recording operation is not completed, the processings following step S23 are repeated. On the contrary, if it is determined that the reproducing/recording operation is completed, it is checked whether or not the source is switched (step S30).

In the case where the program information recorded on the optical disc 12 is specified to be reproduced, a recorded flag is set up in the recording area such as file folder (step S31). Also, in the case where the other source such as the tuner section 6 is specified, the reproduction with that source is continued, the recorded flag is set up in the recording area such as file folder, and the reproducing operation of the program information recorded on the optical disc 12 is stopped.

In this manner, the program information is recorded on the hard disk B while being reproduced from the optical disc 12, the program information recorded halfway is prevented from being accumulated, even if there occurs an event like that the supply of electric power is cut out during the reproducing/recording operation, whereby it is possible to effectively utilize the hard disk B.

In the above embodiment of the invention, the second recording medium is the hard disk. However, this invention is also applicable to the recordable recording medium such as MD as the second recording medium.

As described above, with the present invention, the reproduction of the program information recorded on the optical disc and the recording onto the hard disk are concurrently made without regard to a user's will, whereby even if an event such as cut out of electric power supply or communication error occurs, the program information recorded halfway on the hard disk (not recorded to the end of data) is prevented from being accumulated, thereby effectively utilizing the recording area. When the deleted program information is recorded again after the event is resolved, the reproducing/recording operation is resumed from its top position, whereby the recording is enabled continuously and with high accuracy.

What is claimed is:

1. An information recording/reproducing apparatus for reproducing program information recorded on a first recording medium and recording the reproduced program information on a second recording medium, the information recording/reproducing apparatus comprising:

reproducing means for reproducing program information recorded on the first recording medium;

recording means for recording the program information reproduced by the reproducing means on the second recording medium;

deletion means for deleting the program information recorded on the second recording medium; and control means for controlling the reproducing means and the recording means to perform the parallel processings of recording the program information on the second recording medium and reproducing the program information from the first recording medium, wherein the control means controls the deletion means to automatically delete the program information that is not completely recorded at the time when an event of interrupting the reproducing/recording operation occurs while reproducing and recording the program information by the reproducing means and the recording means.

2. The information recording/reproducing apparatus according to claim 1, wherein the control means controls the deletion means to automatically delete the program information that is not completely recorded on the second recording medium, when the supply of electric power to at least one of the reproducing means and the recording means is cut out.

3. The information recording/reproducing apparatus according to claim 1, wherein the control means controls the reproducing/recording operation to be resumed from the top position of the program information that is automatically deleted, when the event of interrupting the reproducing/recording operation is resolved.

4. An information recording/reproducing apparatus comprising:

a reproducing unit for reproducing program information recorded on a first recording medium;

a recording unit for recording on a second recording medium the program information reproduced by the reproducing unit;

a controller for controlling the reproducing unit and the recording unit to perform at a same time recording the program information on the second recording medium and reproducing the program information from the first recording medium, a deletion unit for deleting the program information recorded on the second recording medium;

wherein the controller controls the deletion unit to automatically delete the program information not completely recorded when interruption of the reproducing or recording operation occurs while reproducing and recording the program information by the reproducing unit and the recording unit.

5. The information recording/reproducing apparatus according to claim 4, wherein the controller controls the deletion unit to automatically delete the program information not completely recorded on the second recording medium when electric power supply to at least one of the reproducing unit and the recording unit is stopped.

6. The information recording/reproducing apparatus according to claim 4, wherein the controller controls the reproducing/recording operation to be resumed from the top position of the program information that is automatically deleted, when the interruption of the reproducing/recording operation is resolved.

* * * * *